US011797133B2

(12) United States Patent
Morris et al.

(10) Patent No.: US 11,797,133 B2
(45) Date of Patent: Oct. 24, 2023

(54) DISPLAY CAPABLE OF INTERACTING WITH AN OBJECT

(71) Applicant: T1V, Inc., Charlotte, NC (US)

(72) Inventors: James E. Morris, Lake Wylie, SC (US); Michael R. Feldman, Huntersville, NC (US)

(73) Assignee: TIV, INC., Charlotte, NC (US)

( * ) Notice: Subject to any disclaimer, the term of this patent is extended or adjusted under 35 U.S.C. 154(b) by 0 days.

(21) Appl. No.: 17/867,712

(22) Filed: Jul. 19, 2022

(65) Prior Publication Data

US 2022/0350440 A1 Nov. 3, 2022

Related U.S. Application Data

(63) Continuation of application No. 17/073,491, filed on Oct. 19, 2020, now Pat. No. 11,416,104, which is a continuation of application No. 15/207,841, filed on Jul. 12, 2016, now Pat. No. 10,809,854, which is a continuation of application No. PCT/US2015/010838, filed on Jan. 9, 2015.

(60) Provisional application No. 61/987,341, filed on May 1, 2014, provisional application No. 61/926,845, filed on Jan. 13, 2014.

(51) Int. Cl.
*G06F 3/042* (2006.01)
*G06F 3/0488* (2022.01)
*G06F 3/041* (2006.01)
*G06F 3/02* (2006.01)
*G06F 3/0486* (2013.01)

(52) U.S. Cl.
CPC .......... *G06F 3/0425* (2013.01); *G06F 3/0227* (2013.01); *G06F 3/0416* (2013.01); *G06F 3/0486* (2013.01); *G06F 3/0488* (2013.01); *G06F 2203/0382* (2013.01)

(58) Field of Classification Search
CPC .... G06F 3/0425; G06F 3/0227; G06F 3/0416; G06F 3/0486; G06F 3/0488
USPC ........................................................ 345/175
See application file for complete search history.

(56) References Cited

U.S. PATENT DOCUMENTS

| | | | |
|---|---|---|---|
| 6,011,487 A | 1/2000 | Plocher | |
| 7,988,037 B2 | 8/2011 | Yach | |
| 8,482,534 B2 | 7/2013 | Pryor | |
| 8,539,359 B2 | 9/2013 | Rapaport et al. | |
| 9,367,860 B2 | 6/2016 | McKirdy | |
| 10,026,505 B2 | 7/2018 | Lack et al. | |
| 2003/0210229 A1* | 11/2003 | Nishimura | G06F 3/0425 345/157 |
| 2006/0139314 A1 | 6/2006 | Bell | |
| 2007/0024590 A1* | 2/2007 | Krepec | G09G 5/08 345/173 |
| 2008/0198138 A1 | 8/2008 | McFarlane et al. | |
| 2009/0116692 A1 | 5/2009 | Paul et al. | |
| 2009/0309846 A1 | 12/2009 | Trachtenberg et al. | |

(Continued)

FOREIGN PATENT DOCUMENTS

WO 2012/120524 A2 9/2012

OTHER PUBLICATIONS

International Search Report dated May 6, 2015 for PCT/US2015/010838 filed Jan. 9, 2015.

*Primary Examiner* — Calvin C Ma
(74) *Attorney, Agent, or Firm* — XSENSUS LLP

(57) ABSTRACT

A system includes a screen and a computer that detects an object near the screen and allows interaction between the object and the computer.

18 Claims, 12 Drawing Sheets

(56) References Cited

U.S. PATENT DOCUMENTS

| | | |
|---|---|---|
| 2010/0045816 A1 | 2/2010 | Rhoads |
| 2010/0194703 A1 | 8/2010 | Fedor et al. |
| 2012/0007818 A1* | 1/2012 | Koga .................... G06F 3/1423 345/173 |
| 2012/0249741 A1 | 10/2012 | Maciocci et al. |
| 2012/0269382 A1 | 10/2012 | Kiyohara et al. |
| 2013/0050258 A1 | 2/2013 | Liu et al. |
| 2013/0084970 A1 | 4/2013 | Geisner et al. |
| 2014/0108842 A1 | 4/2014 | Frank et al. |
| 2014/0168716 A1 | 6/2014 | King et al. |
| 2014/0267004 A1 | 9/2014 | Brickner |
| 2016/0299569 A1 | 10/2016 | Fisher et al. |
| 2016/0371886 A1 | 12/2016 | Thompson et al. |
| 2019/0102783 A1 | 4/2019 | Sanjay et al. |

* cited by examiner

DISPLAY CAPABLE OF INTERACTING WITH AN OBJECT

CROSS-REFERENCE TO RELATED APPLICATIONS

This application is a continuation of U.S. application Ser. No. 17/073,491, filed Oct. 19, 2020, which is a continuation of U.S. application Ser. No. 15/207,841, filed Jul. 12, 2016 (now U.S. Pat. No. 10,809,854), which is a continuation of PCT/US2015/010838, filed Jan. 9, 2015, which claims priority under 35 U.S.C. § 119(e) to U.S. Provisional Application No. 61/926,845, filed on Jan. 13, 2014, and to U.S. Provisional Application No. 61/987,341, filed on May 1, 2014, the entire contents of each are incorporated herein by its reference.

BACKGROUND

1. Field

Embodiments are directed to a recognizing an object on or near a display screen.

2. Description of the Related Art

Object recognition has been realized on a touch screen, e.g., using a touch screen that includes a camera or optical sensor embedded in the touch screen. With previous approaches, a bar code or a label with a particular pattern is placed on the bottom surface of an object. The object is placed on the table and the camera is used to read the pattern on the label. However, hardware for these types of touch screens is more expensive than other hardware, e.g. PCT (Project Capacitive Technology), which can detect touch, but cannot detect optical patterns on a label on an object, and non-touch screen technology.

SUMMARY

One or more embodiments is directed to a system, including a screen, and a computer that detects an object near the screen through use of a camera on the object without using a visible code on the object and that sets up a dedicated link between the object and the computer.

One or more embodiments is directed to a system, including a large format display, and a host computer in communication with the large format display, wherein, when an object including a camera is near the large format display, the host computer displays codes on the large format display for detection by the camera, to establish a dedicated link with the object based on the codes detected by the camera, the host computer to determine a location of the object.

The system may include an interactive sensor.

The host computer may determine a location of the object in response to a touch by a user adjacent the object.

The host computer may display a representation of the object in a region adjacent the object.

When the object includes an interactive sensor, items dragged off of the object towards a border of the representation may be sent to the large format display.

Items dragged from the large format display towards the representation may be sent to the object.

The host computer may be configured to run a device present code across the large format display and determine whether the camera detects the device present code. The device present code may be invisible to viewers of the large format display. The device present code may include varying at least one of color and brightness by a predetermined amount for a preset block of pixels. The device present code may include varying at least one of color and brightness by a predetermined amount for a preset block of pixels over specific time intervals.

Once a device is determined to be present due to detection of the device present code by the camera, the host computer may run a code with position identifiers across the large format display and determine whether the camera detects the code with position identifiers.

The host computer is configured to run the code with position identifiers across increasing smaller regions of the large format display until the position of the object is determined.

If the code with position identifiers includes more than one code block pixel, the host computer may extrapolate an orientation of the object on the large format display.

Once the position of the object is determined, the host computer may run a code with orientation identifiers at the position of the object to determine an orientation of the object on the large format display.

The large format display may be oriented horizontally. The object may be placed on the large format display.

The host computer may not use a physical unique identifier on the object.

The host computer may not use an optical sensor to determine the location of the object.

The view of the camera may not be displayed on the object's screen.

The host computer may establish the dedicated link automatically.

The location of the object may be directly on the large format display. The location may be on a specific region of the large format display. The specific region of the large format display may be predefined or user defined. The specific region of the large format display may be determined by the host computer. The host computer may display a representation of the object on the large format display in the specific region.

The location of the object may be adjacent the large format display. The location may include a specific region of the large format display. The specific region of the large format display may be predefined or may be user defined. The specific region of the large format display may be determined by the host computer. The host computer may display a representation of the object on the large format display in the specific region.

The host computer may display a region on the large format display to which items to be transferred between the large format display and the object are to be placed. The object may be used to change content of the region. The region may be adjacent the object.

The host computer may run a code with position identifiers across the large format display to determine the location of the object.

One or more embodiments is directed to a system including a large format display, at least two wireless transmitters, and a host computer in communication with the large format display, wherein, when an object having a wireless receiver in communication with the at least two wireless transmitters is near the large format display, the host computer uses relative signal strength from the at least two wireless transmitters detected by the wireless transmitters in the object to determine a location of the object.

DETAILED DESCRIPTION

Embodiments are directed to a method of establishing communication between a mobile device, e.g., a smart phone, a tablet, and so forth, and a large format (LF) screen so that information on the mobile device or associated with the mobile device can be displayed on the LF screen and information on the LF screen can be transferred to the mobile device. The mobile device may include an interactive sensor, e.g., a touch sensor, a gesture sensor, and so forth. The LF screen may be embedded in table or a kiosk or placed on a wall of a stand. Such communication needs a communication link to be established between the mobile device and a display computer driving the LF screen.

In a single person mode, the link may be established in manner so that the person using the LF screen is the owner of the mobile device that is connected to the LF screen during that person's session. In a multi-person mode, the link may be established in manner so that the person using that person's section of the screen is the owner of the mobile device that is connected to the corresponding section of the screen that the person is using. Single person mode as used herein is to mean only one person is associated with the use of each LF screen. More particularly, one mobile device is associated with each LF screen. In multi-person mode, multiple mobile devices are associated with an LF screen. So in multi-person mode, there can be communication links established for a single LF screen with multiple mobile devices.

One way to establish a communication link is using passwords as described in U.S. Patent Application Publication No. 2012/0162351 A1, which is incorporated by reference herein in its entirety. When a user desires to interact with an LF screen the screen could display a password or code for the user to type in to their mobile device. Alternatively, the password could be displayed on the mobile device and the user could type the password in on a virtual keyboard displayed on the LF screen if the LF screen is a touch screen. However, many would prefer to interact with a system without having to remember/input passwords. Thus, one or more embodiments is directed to establishing links without the user having to enter passwords for each session.

Figure 12:
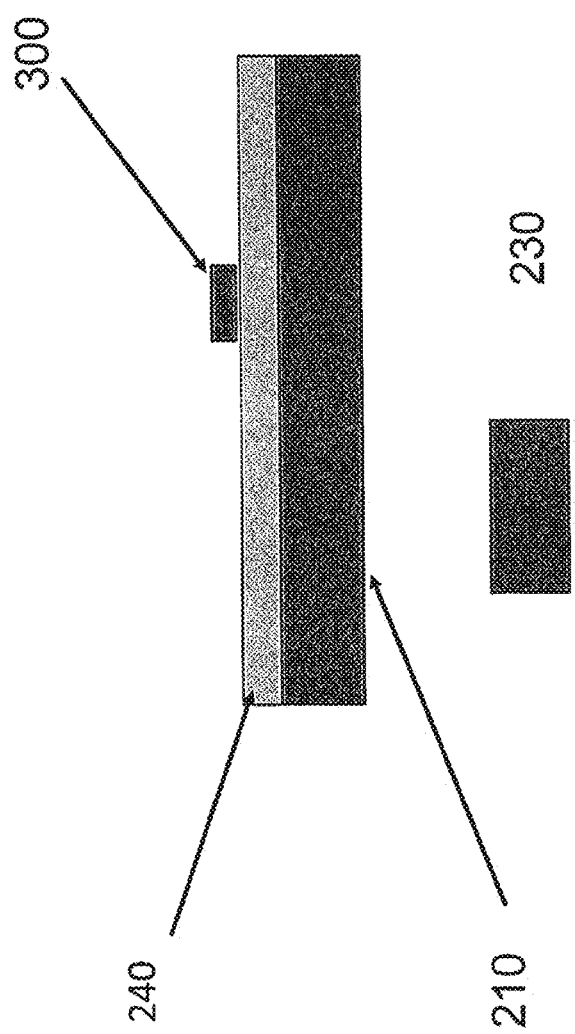
FIG. 12 illustrates a configuration according to an embodiment.
Figure 13:
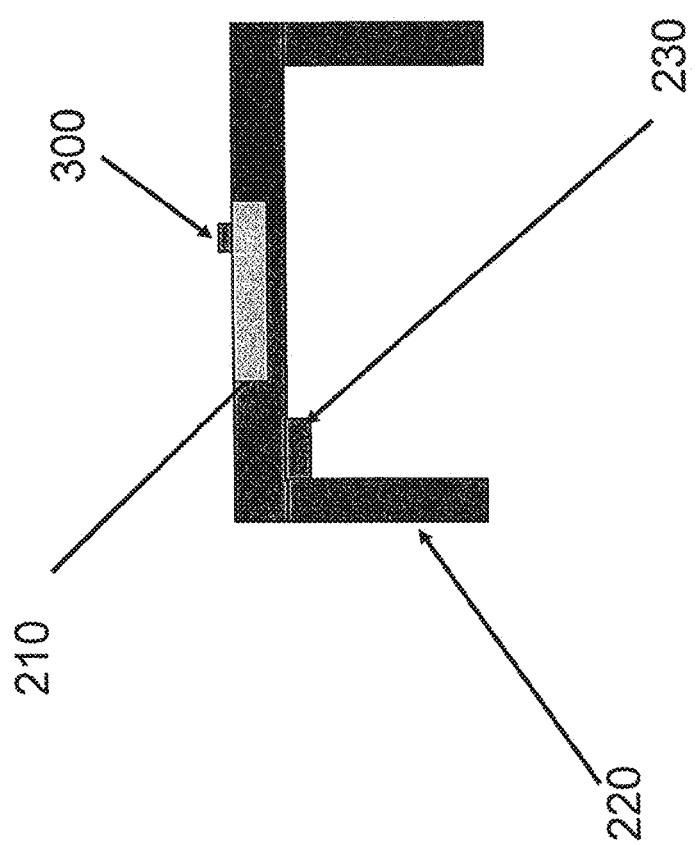
FIG. 13 illustrates a configuration according to an embodiment.

Typically there will be a Large Format (LF) screen 210, with or without an interactive sensor 240, e.g., a touch sensor, a gesture detector and so forth, embedded in a table 220, and a display computer 230, as illustrated in FIGS. 12 and 13. Additional elements, e.g., a piece of cover glass, a diffuser, a structural mechanical mount, and so forth, may be provided above or below the interactive sensor 240, e.g., between interactive sensor 240 and LF screen 210.

Figure 1:
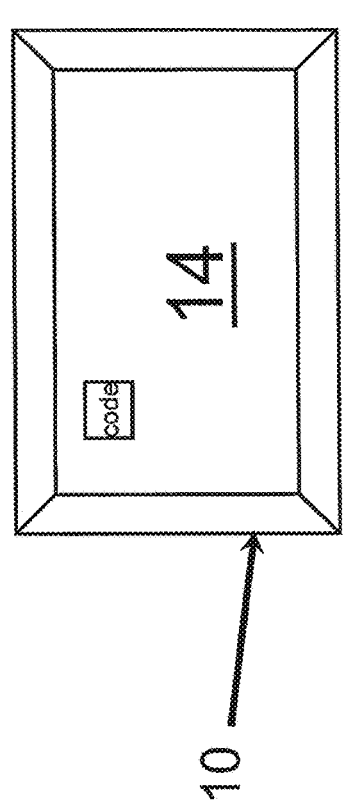
FIGS. 1 and 2 illustrate a top schematic view of a table display providing a code to a mobile device according to embodiments.

One alternative to continuously entering passwords is the use of a bar code, e.g., a quick response (QR) code, as shown in FIG. 1. When a QR code is displayed on the table display 14, a camera in the mobile device can take a picture of the QR code. Reader applications for QR codes are ubiquitous. The QR code detected by the reader application on the mobile device then directs the user to a specified website. In particular, each QR code could be unique to each table, to each request, and/or each session. Each unique QR code could take the user to a different web address. Every time a new QR code is read, the mobile device would be directed to a unique URL address which can act as a key (embedded password) for the display computer 230. Then, when the display computer 230 detects a device trying to access it, with the correct key, the display computer 230 determines that the device just received the QR code. This website could obtain a key from the mobile device. Then, the display computer 230 can note a particular characteristic of the mobile device, e.g., a MAC address, an IP address, a device name, and so forth. Once this happens, the display computer 230 can instruct the user to share information with the table system. The user can then follow the instructions to share content with the display computer 230. Content may be shared either with using built in features of the operating systems of the mobile device, e.g., Airplay with iOS. When the user tries to stream information to the display computer 230, the display computer 230 will check the MAC address or ip address of the mobile device to make sure it is valid. If so, the display computer 230 may then allow content to be shared.

Another alternative when using a bar code or QR code is to use an interactive application (IA) loaded on a mobile device 300. The IA can digitize output from a mobile device and stream it to the display computer 230, or utilize the mobile devices OS to stream the contents of the mobile device's screen as described in U.S. Patent Application Publication No. 2013/0219295 A1, which is incorporated by reference herein in its entirety. By using the IA, security can be very robust and not be dependent on an operating system of a particular mobile device. The QR code could automatically direct the user to a website that would ask whether the user wants to download the IA. Alternatively, instructions, including a website from which the IA can be downloaded, could be displayed, e.g., on the table display 14. Once the IA is downloaded or otherwise on the mobile device, a QR code would be displayed again, either the same or a new QR code, to obtain the key information.

Figure 2:
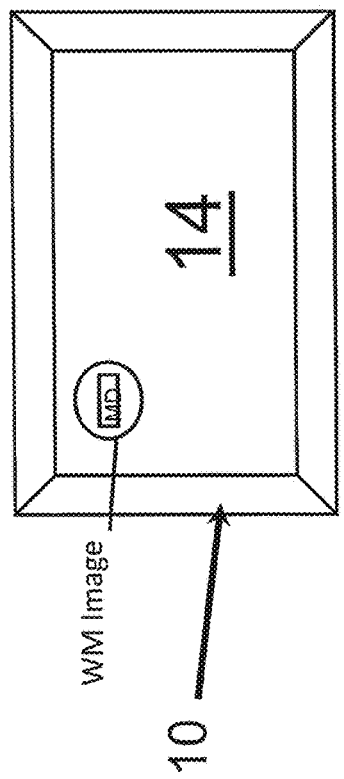

As an alternative to using a QR code, a camera of the mobile device may detect a digital watermark, as shown in FIG. 2. This digital watermark is similar to a QR code in that it gives a digital code back to the IA, but the digital watermark is imbedded in the LF display and is not visible to the user. The application sends this code to a server along with the username password, which may be encrypted. Once the server receives this code, the server knows exactly which table and which session on that table to send the username and password to, e.g., the QR code may be unique for each table and session. This allows multiple people to login to user sessions on the same display or multiple people using displays that are located very close to each other. The digital watermark could be embedded in a particular image ("WM Image"), e.g. logo, or dedicated region, as moving or changing images are harder to focus on. In this case, typically the mobile device would not be able to be placed directly on the table or display. Typically, the user would hold the device and look through the camera in order to focus on the WM Image. Once the WM Image is in focus, then the IA would grab the image and decode it.

Note that in both cases (use of the QR code and WM Image), a unique password or code is associated with QR code/WM Image. In single person mode, this unique password/code would therefore be associated with a particular LF screen. Once the QR code or WM Image is scanned, the unique password/code is also associated with a particular mobile device and there can now be a dedicated communication link established between the mobile device and the LF screen, i.e., nearby users would not be able to send/receive information from the LF screen. (Host computer knows which mobile device to receive and send information to.) Similarly, in multi-person mode, the dedicated link is established with a mobile device and a section of the LF screen.

Note that for multiperson mode, as described in U.S. Pat. No. 8,583,451 B2, which is incorporated by reference herein in its entirety, the screen may be divided in to sections with clear boundaries, for each user. A QR code or WM Image could be displayed in one of these sections to associate that section with a particular user/mobile device. Once the communication link is established in this manner, information from the mobile device could be obtained from the host computer including for example a user name. The user name could then be displayed in the section of the LF screen corresponding to the mobile device (section for which the mobile device scanned the QR code or WM Image). If the LF screen is a touch screen, then sections of the screen could then be rearranged on the LF screen (e.g. change in position and size) with the communication links preserved with a visual indication (such as display of the user name), such that each section could be associated with a different user/mobile device.

Another way to handle multiple users connected to a single LF screen, is to display the user names in a particular section of the screen (User Name Section). Then when data is required to be exchanged in a particular section of the LF screen, a user name can be chosen from the User Name Section. For example, suppose a pdf file is chosen on the LF screen and an option on the LF screen is chosen to email this file out. An email window could then be displayed on the LF screen and one of the names in the User Name Section could then be dragged to the email window. Once this occurs, the information in this window would then be associated with the user corresponding to the name dragged in this manner (e.g. email address, name, company name, etc.)

One potential disadvantage with these approaches is the mobile device may need to be held away from the LF display in order to bring the QR code or the WM Image into focus. Typically, these approaches also require the user to view the camera's output and adjust the position to bring the QR code or the WM Image in to focus. This is satisfactory for use with an LF screen that is not positioned such that the mobile device could be placed thereon, e.g., a wall mounted LF screen. However, it would be faster and more convenient to place the mobile device directly on the LF screen and enable the handshaking to occur automatically, e.g., passively, i.e., without any action on the part of the user. It is also desirable to, on the mobile device's touch screen, display instructions and/or graphics associated with the transaction taking place that may be different from the graphics displayed on the LF screen. It is often further desirable to display this instead of displaying the output from the camera.

An alternative to using the QR code or the WM Image is to use location information embedded in each mobile device. If the mobile device is running the IA, then the host computer can access the GPS information. This typically will be more useful in single person mode. If the GPS information is accurate enough, and there is only one mobile device within a designated distance of the display computer, then the display computer can assume that this mobile device is the one to be connected to the LF screen. To further ensure that the correct mobile device is connected, once a connection is needed to be established, for example when a password or email device would be typically requested on the LF screen, a Connection Request Message could be displayed on either the LF screen or the mobile device. For example, if it is displayed on the mobile device it could ask if the user would like to establish a connection with the particular LF screen or table/furniture. If the display computer detected multiple devices within range of is associated LF screen, it could send this request to all of the devices within a specified range. Alternatively, if the Connection Request Message (CRM) is displayed on the LF screen it could list all devices within range on the LF screen (or user names associated with each of them) and the user could select their name from the list to establish a connection.

From this point on, as long as this mobile device remains within a specified region from the LF screen from the GPS coordinates, then communication between the display computer and the mobile device can take place.

For multi-person mode, distinct regions can be displayed on the LF screen as described previously. These regions could be either pre-determined or user-defined regions. If multiple devices are detected within range of a table and the names displayed as described above, different names could be dragged in to different regions, to associated specific users with specific sections of the LF screen. If CRM's are sent to multiple devices within range of an LF screen and more than one of these are accepted by the user, then the names for only those that are accepted could be displayed on the LF screen and the individual names could then be dragged to specific regions of the LF screen.

However, currently GPS information from mobile devices is not accurate enough for this purpose for many applications. Current GPS accuracy in mobile devices is limited to about 50 ft to 100 feet and less in high traffic areas. GPS may be used to determine, for example, which mobile devices are in a building, but probably not which are within a few feet of a table, let alone on the table.

Another option would be to use wireless transmitters, e.g., Bluetooth Low Energy (BLE) transceivers. Through triangulation and using multiple wireless transmitters, the accuracy to within 10 to 20 feet, which may be accurate enough in some cases. The signals from these wireless transmitters would be detected by wireless receivers on the mobile device 300.

Yet another option would be to place the wireless transmitters in multiple locations around the periphery of the LF screen. In this case, by looking at the difference between signal strengths detected by the BLE receivers on the mobile device 300, one can determine whether or not the mobile device is inside a region formed by a geometric perimeter formed by the locations of the BLE transmitters. If the GPS or BLE methods described above are not accurate enough to detect the location of the mobile device, then a code method described below may be used.

Designated Regions

In addition to determining which device to associate with a particular LF screen or screen section, it is sometimes further desirable to also have the display computer know more precisely where on the LF screen a particular phone is located. This may be achieved by providing designated areas on the LF screen on which a user is to place the mobile device or hold the mobile device adjacent thereto. These designated areas could either be predetermined or use-defined.

Figure 5:
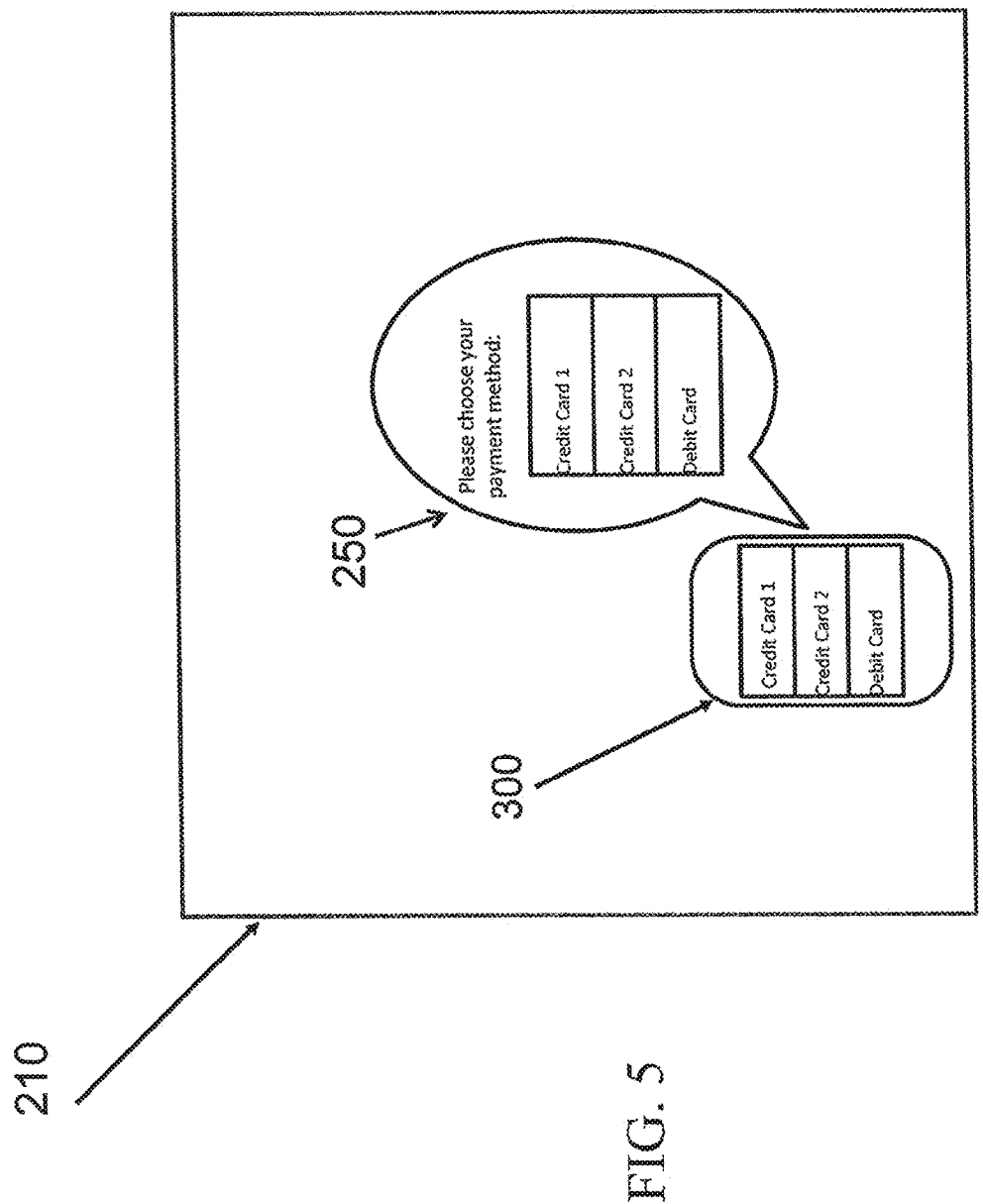

For example, a predetermined region could be indicated on the LF screen as where a user can place a mobile device or hold the mobile device adjacent thereto. When a password is needed, the LF screen could display text, e.g., "place mobile device here to connect to this screen." Alternatively, a user may place the mobile device in contact with or hold the mobile device adjacent to the LF screen having a touch screen embedded therein and indicate, e.g., outline, circle, and so forth, the mobile device, to define a designated region, as illustrated in FIG. 5.

Once the mobile device is placed on the designated region or the designated region is defined by the user, then as long as the display computer can detect which mobile device is on the screen, the host computer would know where on the LF screen the mobile device is located. Information can be dragged to the mobile device from the LF screen or off of the mobile device onto the LF screen as described below.

Direct Contact Camera Codes (DCCC)

As described previously, in some cases BLE and/or GPS may not be accurate enough to determine which mobile devices to connect to a particular LF screen. In this case a Direct Contact Camera Code (DCCC) can be used. DCCC codes have multiple purposes: (1) they can be used as an alternative or to supplement the methods described above to determine which mobile device to associate with an LF screen, (2) they can be used to determine the exact location of a mobile device on an LF screen and/or (3) once a communication link is established, the mobile phone can be moved on the screen and the precise location of the device on the screen can still be determined.

Once the mobile device is in the predetermined or user defined designated region, then a DCCC code can be displayed within the designated region only. In this case, simpler codes can be used as compared with a digital watermark, since the need to have the code be invisible to the user is not as necessary, since the majority of the designated region may be covered by the mobile device. The table display 14 may display a time sequential code, e.g., a series of colors, within the circle. Just as in the case of the QR code method and the WM Image method, a unique key, password, or other information can be embedded in the DCCC. The mobile device detects the DCCC code and then tries to connect to the display computer using the information embedded in the DCCC. Since the display computer will know where the mobile device is and the physical location will block the image being displayed on the LF display from users, the code may be simpler and easier to detect by the camera of the mobile device, as the code would no longer have to be invisible to users.

In multi-person mode, a first person can place their mobile device in a first designated region. Once this mobile device is detected and connected, a second user can be directed to place their mobile device in a second designated region. The multiple devices can be detected simultaneously if different information is embedded in the different DCCCs to designate the particular region within the LF screen.

If designated regions are not to be used, i.e., a user may place a mobile device anywhere on a LF screen, the following approach may be used. As described below, DCCC codes displayed on the LF screen may be used to determine the precise location of the camera and orientation of the mobile device as well as the perimeter of the mobile device.

Figure 3:
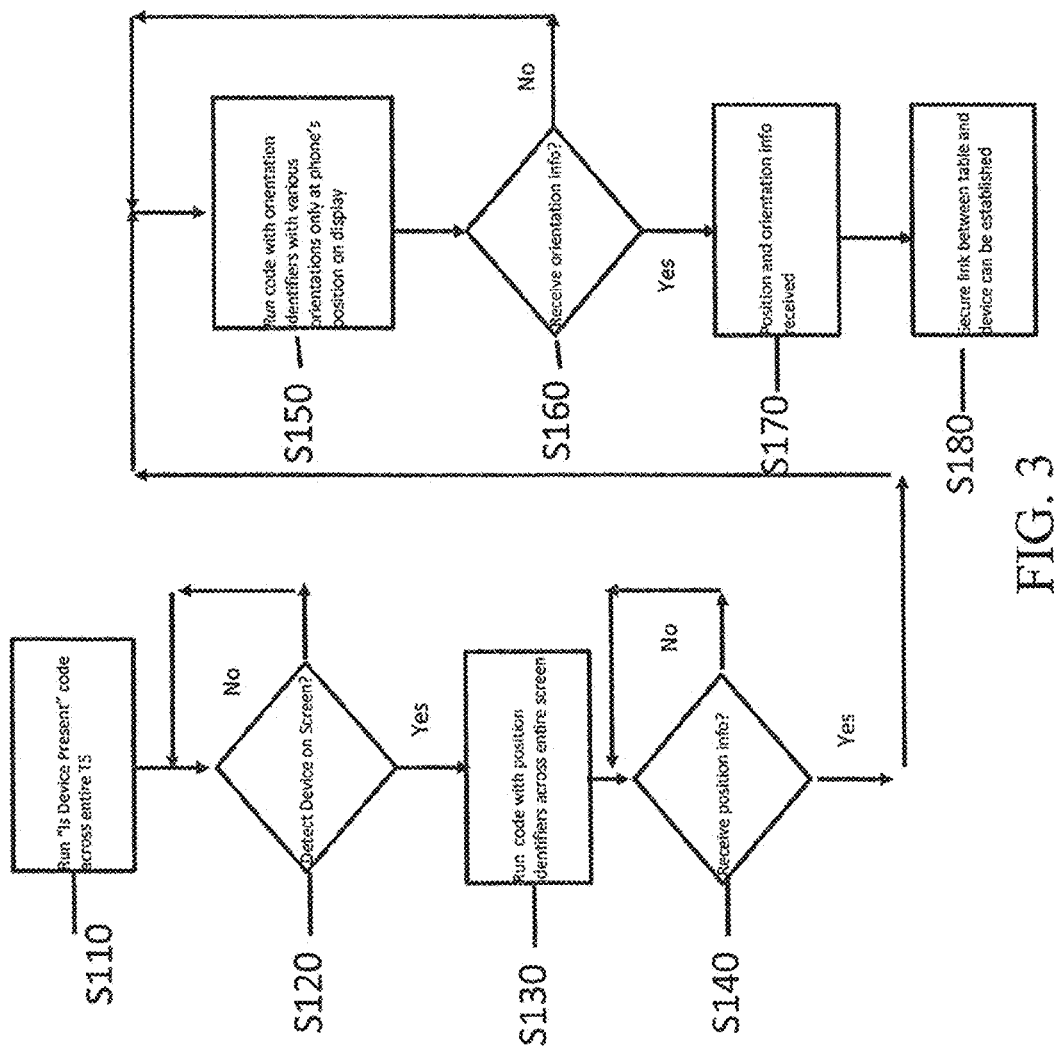
FIG. 3 illustrates a flow chart of a method from the point of view of a display computer according to an embodiment.

FIG. 3 illustrates a flow chart of a method from the point of view of a display computer according to an embodiment. As illustrated in FIG. 3, rather than an indicator physically on an object near a display, an interactive application (IA) loaded on a mobile device 300 uses the camera function in the mobile device for object recognition, e.g., to establish a dedicated link between the mobile device and a host computer associated with the display, and then allows the mobile device to interact with the display. Typically there will be the Large Format (LF) screen 210, with or without the interactive sensor 240, embedded in the table 220, and the host computer 230, as illustrated in FIGS. 12 and 13.

Initially, the user could place their device on the LF screen with its touch screen face up. In operation S110, a user is instructed to run (or download and run) the IA and place their mobile device (e.g. smart phone, tablet, etc.) on the LF screen. Typically, the mobile device would be placed face up on the LF screen, so that the screen on the device can still be viewed by the user. However, if placed face down, the IA could detect this and make sure the camera has a correct orientation for the mobile device to be recognized. The instruction to run could be provided by the IA on the mobile device and/or by the display computer on the LF screen when the display computer detects a unconnected mobile device within a certain range. Alternatively or additionally, instructions could be posted near the LF display. As a further alternative, when the display computer detects a mobile device having the IA on it, the IA could automatically run on the mobile device. Once placed on the LF display, the IA may force that the camera of the device to be oriented properly towards the LF screen or may detect which camera is oriented towards the screen. When running the IA, the mobile device screen may indicate various modes of operation: detected device, downloading info, etc. For example, a first mode could be "searching;" a second mode could be "location of device on screen found;" and a third mode could be "sharing," etc. In this manner, the IA can activate the camera on the object for the camera to detect the code, but since there is no need for the camera to focus on the code, there is no need for the camera on the object to display the view of the camera on the object's touch screen.

Once placed on the LF screen, the LF screen can display the DCCC coded data in various sections of the LF screen to detect the location of the device on the screen in operation S120. For example, the LF screen could be divided, e.g., into four quadrants, with each quadrant "flashing" a code in a particular color in a specific time sequence. The device application may be set to find this particular sequence in the first mode, e.g., searching mode.

When a device is placed directly on the LF screen, only a very small section of the LF screen is visible to the camera of the device, e.g., a region of about 1-2 mm in diameter up to about ½ inch wide, depending on the distance from the camera to the display. The size of this section may be controlled to some extent by increasing the distance between the top of the upper surface of the table and the LCD display. Increasing this distance helps increase the size of the area viewable by the camera, but also degrades the image on the display, e.g., if there is a diffuser surface on a touch screen surface associated with the LF screen, and increases the parallax issue with touch.

The net result is that typically only 1-2 mm of the display is visible by the camera of the device. Depending on the camera in the device, the view may be quite blurry. Therefore, a useful code to be displayed may be only a small number of effective pixels that can be read at a time, e.g. a 3×3 code block pixel, a 2×2 code block pixel, or only 1 effective code block pixel.

According to a first embodiment for operation S120, a 2×2 code block pixel may be used. Within this 2×2 code block pixel, a color and brightness of each of the four code block pixels may be considered and set to predetermined values. In turn, each of these code block pixels may be multiple pixels on the display, since the camera may not be in focus. The code may be changed with time.

The simplest method would be to use a black and white code and time sequence the code for about 10 iterations×4 which would give us effectively about 40 code block pixels. This code could be displayed over a first half of the LF screen and then over a second half of the LF screen. If a device is detected on the first half of the LF screen, that first half could be divided into, e.g., 2-4 regions and check there and successively decrease the area until the mobile device is found. The first code to be displayed could be a specific code identifying the specific host computer driving the display.

A potential issue with this embodiment is that the user would see the DCCC codes being displayed on the screen. This may prevent other information from being displayed and visible to the user while the DCCC codes are being displayed.

According to another embodiment for operation S120, a visual image is displayed across the entire LF screen, and is varied only in a small region. The variation can be in color and/or brightness and time sequencing can again be used. For example, consider again the 2×2 code block pixels. Each of these regions would have specific values of color and brightness across the display corresponding to the values of the image displayed. In a specific 2×2 region one of these 4 pixels can be increased in value by x % and another decreased in value by x %, etc. After a specific time interval, this increase and decrease can be changed. The application can then search for changes in brightness across the display in the specific pattern in time and space that matches the code.

In this case, images or videos can be displayed on the LF screen as in normal operation, and the first DCCC code could be continuously displayed across the display, even when no device is present, since it would not be detectable to a user. When a device is placed on the display running the app, then the above process could be started, without the need to place the screen in to a "seek device" mode. The same code of 40 code block pixels (4 in space and 10 iterations in time) could be superimposed over the entire screen at the same time and this DCCC code would not be visible to the user.

Once the IA determines the particular sequence has been detected by the camera of the device, the IA could then be moved to the second mode in operation S130. For example, the display computer could also send a second DCCC code across the entire screen, with each location specifying the particular location on the screen where the DCCC code is displayed. In this manner the device would also receive a code indicating its location on the LF screen.

Alternatively, the sections of the screen displaying the code could be made smaller and smaller until the actual location of the device on the screen is found in operation S140. Then the IA could then proceed to the third mode.

In operation S150, orientation of the device on the LF screen may be obtained by using the data collected using the location information from operation S140. For example, the orientation of the DCCC codes found during operation S140, could be used to determine the orientation of the camera on the LF screen, thereby determining the orientation of the device. Alternatively, once the location of the mobile device is detected, a separate DCCC code could be used to determine the orientation of the device. Once operation S160 determines that the orientation information has been received, final verification of receipt of position and orientation may be confirmed in operation S170.

Once the device is detected, the IA and the display computer can then communicate through, e.g., wireless, Bluetooth, or other communication protocol in operation S180 via a dedicated, unique link.

There are numerous examples of data that may be exchanged or shared in the third mode. If the venue is a retail site, the IA may automatically login to an account of a website associated with the retail site. The IA can use saved password and login name to login to store's website or to access information provided by user to the website or can auto login to a user's account, with saved information, including user preferences, user's history, payment information, and so forth.

If the venue is generic or unknown, a website may be displayed on the LF screen 210 asking for a user's password and/or login name. The IA may detect the website displayed and get info from the mobile device for the particular website displayed on the LF screen.

If the venue is a restaurant, the mobile device may share payment information, user account information, photos, videos or other media.

If the venue includes collaborative venues, e.g., libraries, schools, offices, the mobile device may share payment information, media, other documents or files, user preferences, saved sessions, and so forth.

If the venue includes use management, e.g., reservation/wait list/line management, if an LF display is reserved for a particular time, only a mobile device with the correct activation code can use the display at that time. The activation code could be sent to the user, or could be embedded in the app so it is not visible to the user. Here the information exchanged could be just the activation code, but would not require the user to enter the activation code. This could be used any place where you could make an appointment, make a reservation or wait in a line, e.g., government offices, medical offices, banks, airports, restaurants, and so forth.

Depending on the forum, e.g., a library, other research venue, restaurant, the display computer could save sessions associated with the mobile device.

If the mobile device is moved, e.g., dragged, across the LF display, the display computer should still be able to tell where the mobile device is by sending position identifiers in operation 130 to a small region, e.g., 0.5-1 inch for a predetermined period of time, surrounding where the mobile device was previously located. If the mobile device is not found after the predetermined period of time, the mobile device would be considered lost and the method would restart at operation S110. If the mobile device is picked up and moved such that the dedicated link is broken, the method could start over at operation S110.

During re-establishing the dedicated link, e.g., anywhere between operations S130 and S170, the method may ask permission as to whether the dedicated link is to be reestablished, e.g., by entering "OK" on the mobile device or on the LF screen.

By detecting both the position and orientation of the device, information from the device may be displayed on the LF screen as if that information is spilling out of the device and/or the display can display something relative to the mobile device, e.g., the table computer receives information from the mobile device, and then displays it on the LF screen.

Figure 4:
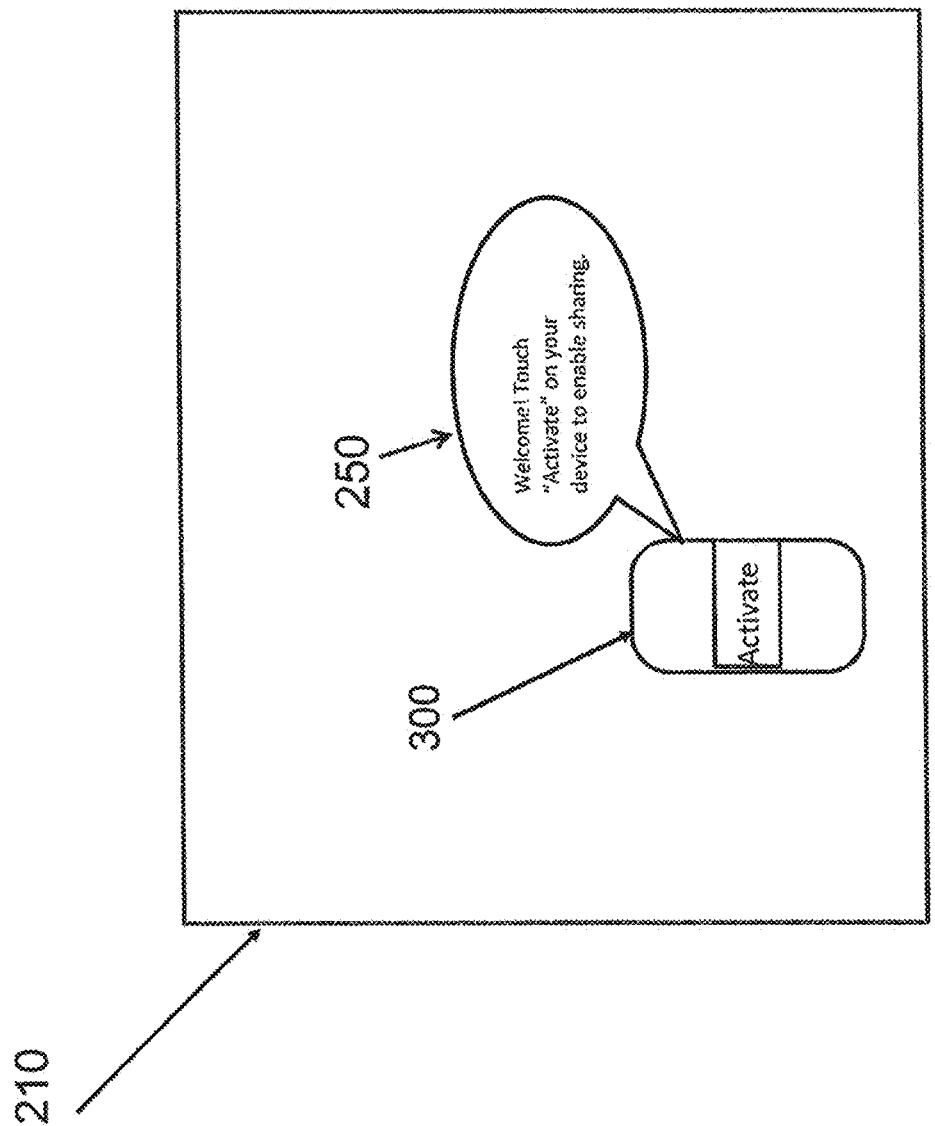
FIGS. 4 to 10 illustrate schematic plan view of the display and the mobile device interacting.

For example, as illustrated in FIG. 4, the display computer 230 could display a bubble 250 adjacent the mobile device 300 with an instruction as how to enable sharing of information on the mobile device with the display computer 230. In the example shown in FIG. 4, the user is instructed to touch the activate button displayed on the mobile device. Once sharing is enabled, the content of the bubble 250 may be altered as appropriate. For example, as shown in FIG. 5, a user may be prompted to select payment information. If the system includes the interactive sensor 240, the user may indicate a region corresponding to the item to be selected for detection by interactive sensor 240 and the interactive sensor 240 would then send the information to the display computer 230. If the system does not include the interactive sensor 240, but the mobile device 300 does, the user may indicate a region corresponding to the item to be selected on the interactive sensor of the mobile device 300 and the mobile device 300 would then send the information to the display computer 230. Using the mobile device to communicate with the display computer 210 and change the content of the bubble could also be provided as an option even when the interactive sensor 240 is present, or this redundant information may not be provided on the mobile device when the interactive sensor 240 is present.

Figure 6:
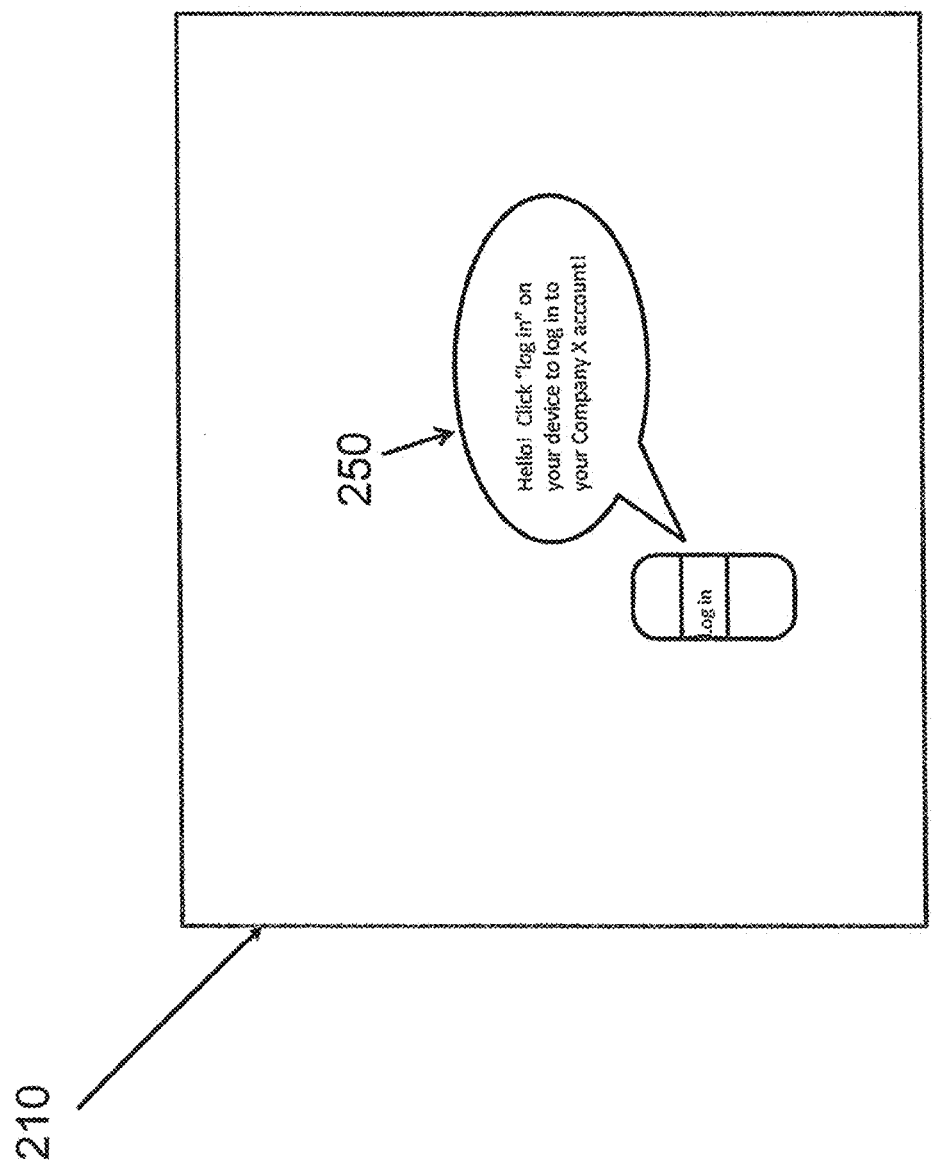

If the IA is part of a larger application dedicated, e.g., to a particular venue, the IA may ask user whether to login at that venue. Such login may allow activity from a previous visit stored on the display computer or in the cloud to be accessed by the user. Such login information may be stored on the mobile device and simply and readily activated by a user. For example, as illustrated in FIG. 6, a login instruction could be displayed in the bubble 250 on the display 210, with the actual login activation being performed on the mobile device, e.g., when the display 210 does not have the touch screen 240. Alternatively, when the display 210 includes a touch screen 240, as shown in FIG. 7, the activation could occur on the display itself, e.g., in the bubble 250.

Figure 7:
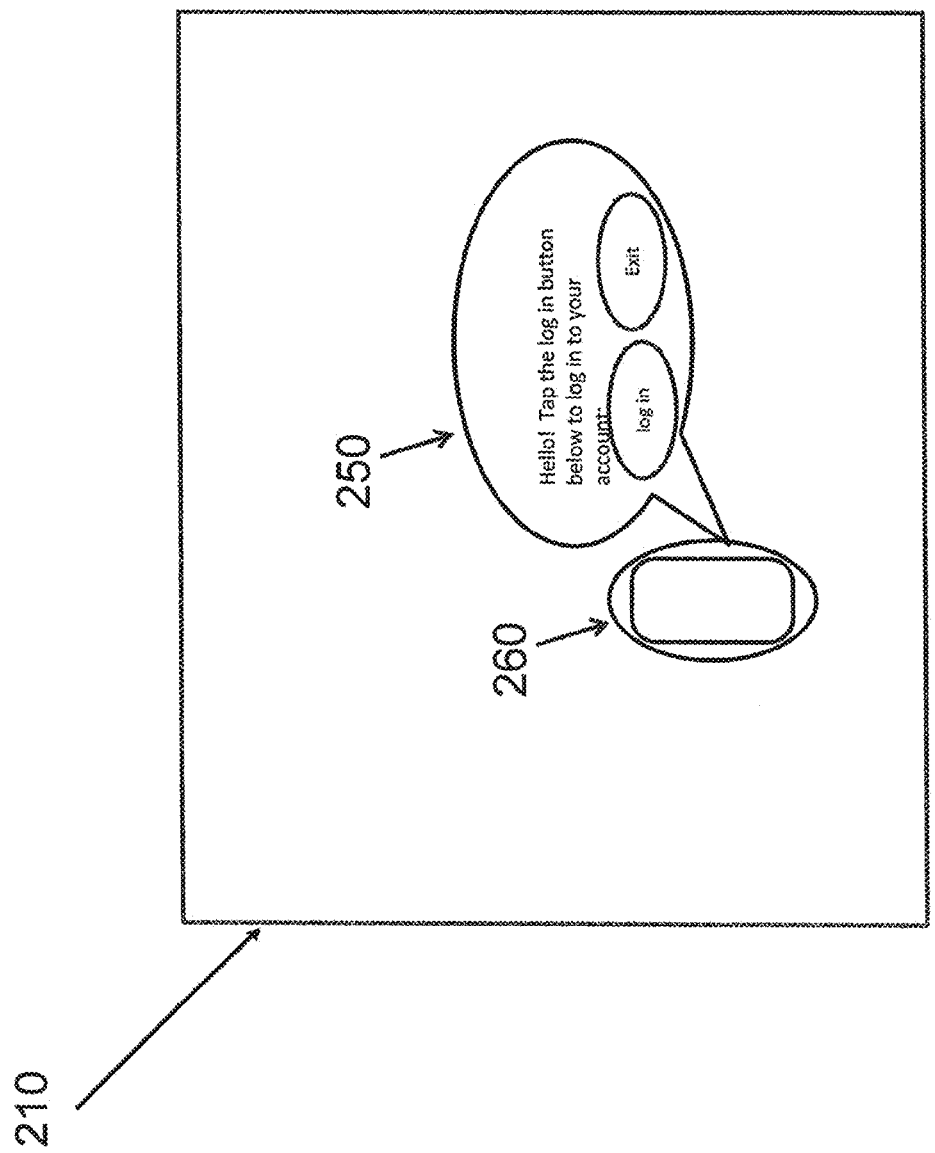

Also, as shown in FIG. 7, the display 210 can display an outline 260 or other representation of the mobile device. The IA can also access the model number, and hence the dimensions of the mobile device on which it is running. As the mobile device is dragged around the LF screen, the outline 260 may move with the mobile device.

Figure 8:
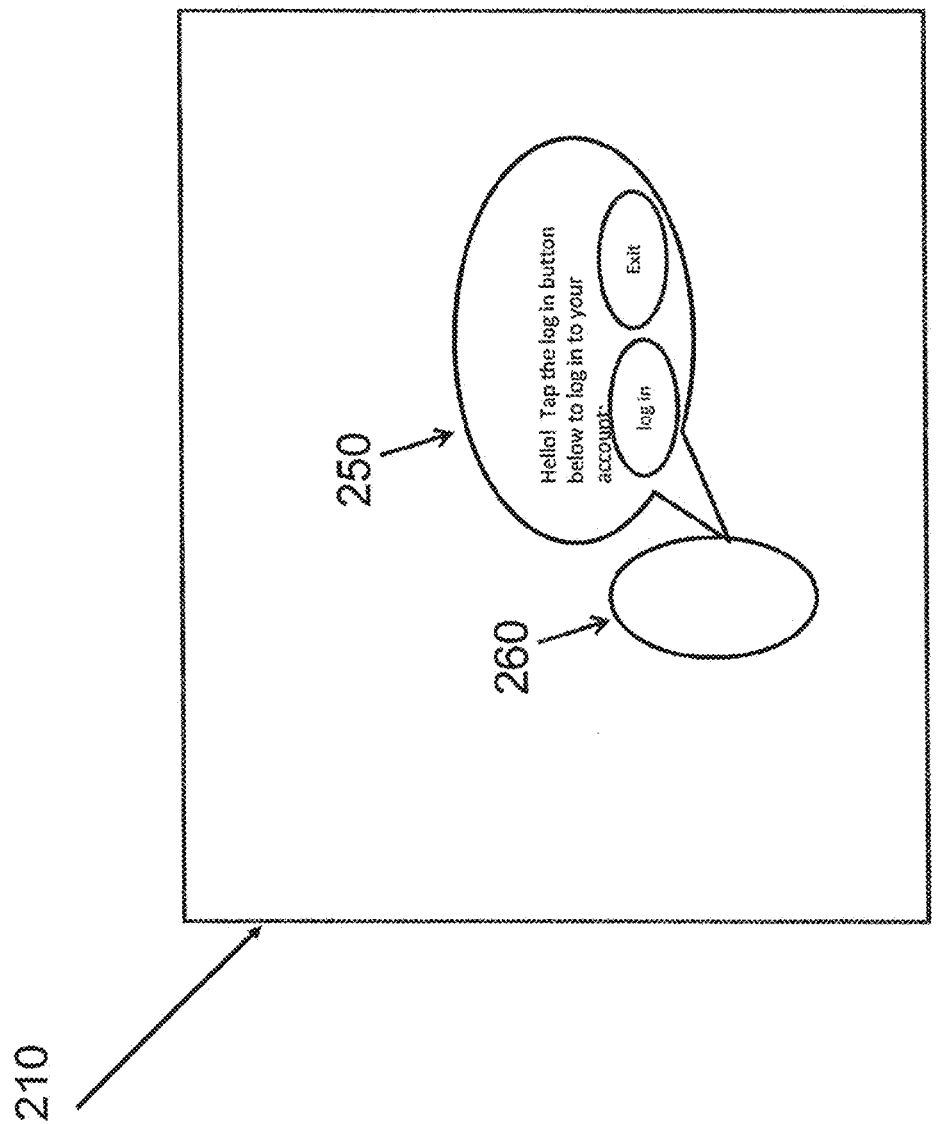

This outline 260 may remain on the display 210 even when the mobile device has been removed, as illustrated in FIG. 8. Thus, while the above has assumed the mobile device is to be placed on a horizontal screen, a mobile device could interact with a display having other orientations by just placing the mobile device against the display while connecting with the display computer, and then, once removed, rather than being disconnected as discussed above, the outline 260 may remain until, e.g., logout, time out, or other disconnect event occurs.

Figure 9:
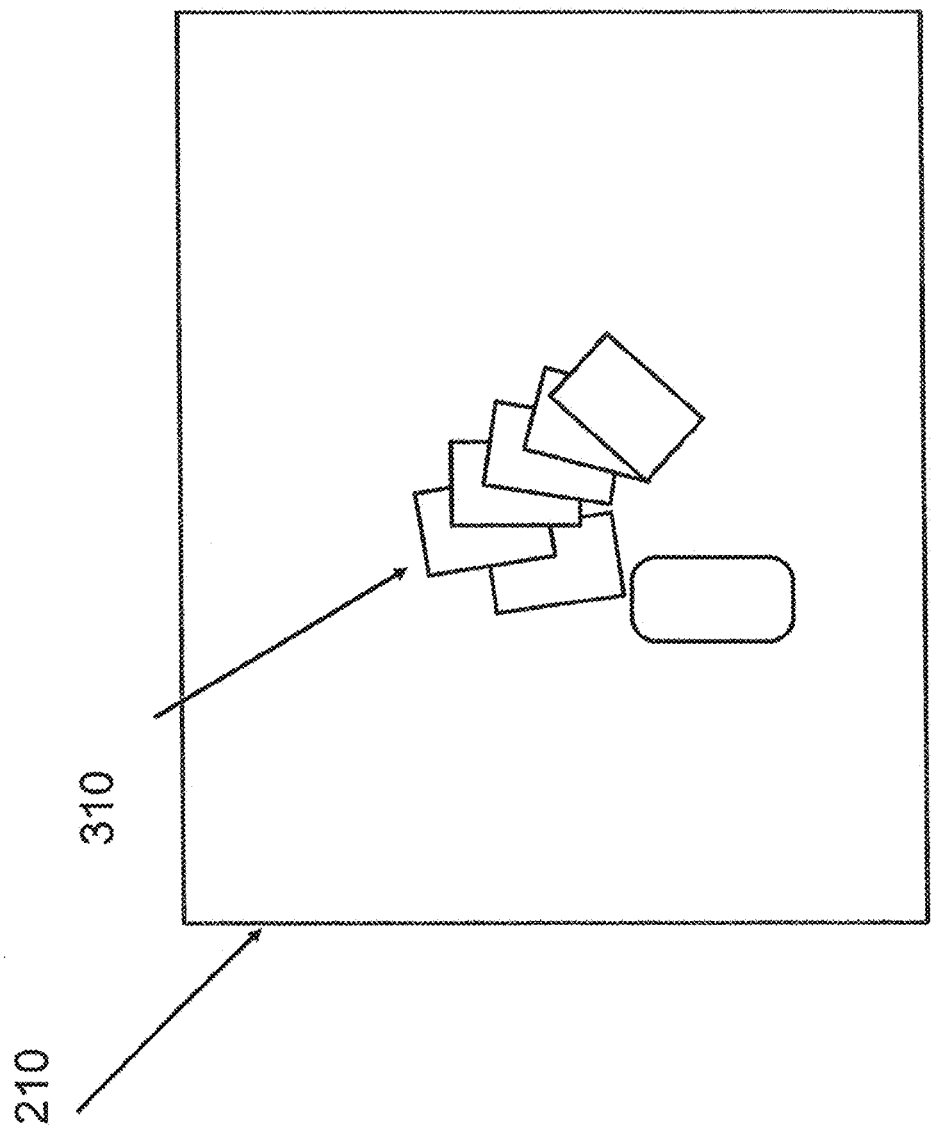

Additionally, as illustrated in FIG. 9, files 310 from the mobile device 300 may be displayed on the display 210, e.g., by dragging particular file off the mobile device, tapping on the file, tossing the file, e.g., as disclosed in U.S. Pat. No. 8,522,153, which is hereby incorporated by reference in its entirety.

Figure 10:
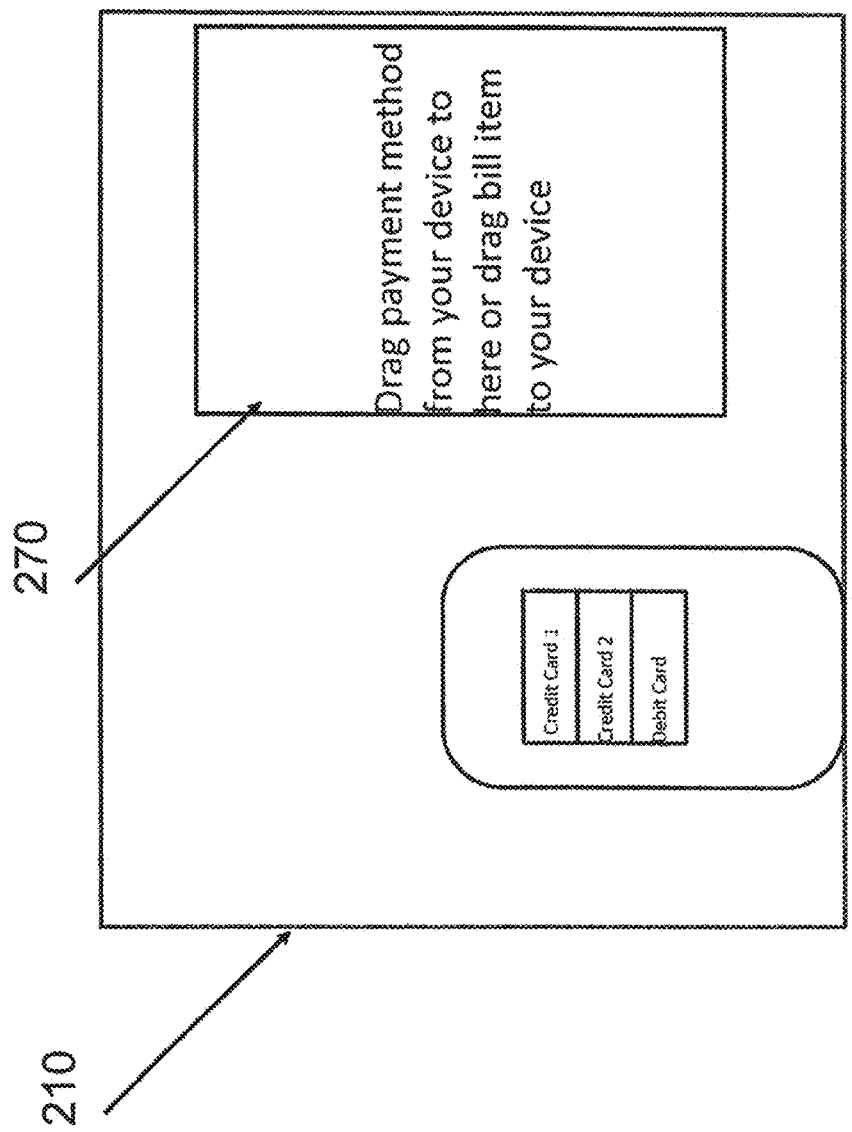

Additionally, virtual objects could be manipulated on the LF screen relative to the mobile devices thereon. For example, as illustrated in FIG. 10, a virtual bill 270 could appear on the LF screen to instruct a user where to drag information from the mobile device for a particular activity, e.g., selecting a payment method displayed on the mobile device. Then, when the LF screen is a LF touch screen, the entire bill could be dragged to a particular mobile device or different items from the bill could be dragged to different mobile devices. Once the bill or particular items have been allocated, the user may then pay using the mobile device. The mobile devices could be physically on the LF touch screen or they could be virtual mobile devices, if the devices have been removed and their outlines or virtual images remain as described above. Additionally or alternatively, the user can drag items on the mobile device off of the mobile device onto the LF screen or onto virtual objects on the LF screen, even if the LF screen is not touchable. For example, methods of payments may be displayed on the mobile device or information for logging in may be displayed on the mobile device.

Using this contact embodiment may simplify determination of where the content came from when multiple devices are supplying content, as well as simpler detection when the mobile device is removed. Once the mobile device is removed from the table, pictures/data associated with that device can also be removed instantly or after a delay, either predetermined or user selected.

Alternatively to the downloading of the IA on the mobile device, a web application may be employed to perform the operations of FIG. 3. For example, a QR code may be provided on or near the display that, once read by the mobile device, loads a website onto the mobile device.

Figure 11:
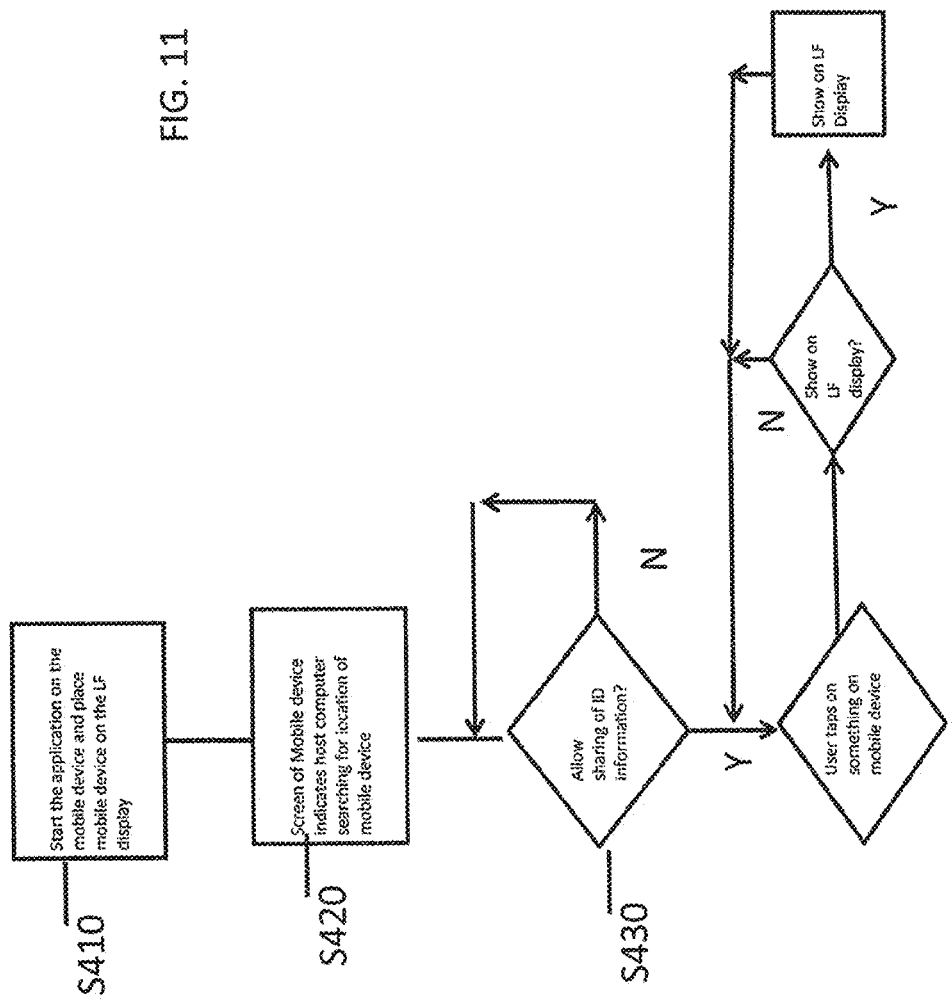
FIG. 11 illustrates a flow chart of a method from the point of view of a mobile device according to an embodiment.

FIG. 11 illustrates a flow chart of a method from the point of view of a mobile device according to an embodiment. In operation S410, a user starts the application on the mobile device and places the mobile device on the LF display. In operation S420, the mobile device indicates the host computer is searching for the location of the mobile device. In operation S430, the host computer asks the user of the mobile device whether the user wants to allow sharing of information.

By way of summation and review, one or more embodiments is directed to detecting objects placed on or near a display using technology that does not use optical sensors and does not require a unique physical identifier, e.g., bar code, on the mobile device to interact with the display. Further, one or more embodiments is directed to detecting an object through use of a camera on the object without using a visible code on the object and set up a dedicated link.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A system, comprising:
   a shared display;
   at least two wireless transmitters or wireless receivers; and
   a host computer in communication with the shared display, wherein, when an object having a wireless receiver or a wireless transmitter that can send signals to or detect signals from one of the at least two wireless transmitters or receivers, the host computer uses relative signal strength between the object and the at least two wireless transmitters or receivers in to determine a location of the object, on condition that the object is near the shared display, the host computer sends a connection request message to the object and, on condition that the object has an interactive application stored therein, the connection request message automatically runs the interactive application on the object to connect the object to the host computer or present a list on the object to be selected on the host computer, and on condition that the object is selected from the list on the host computer, automatically connect the object to the host computer.

2. The system according to claim 1, wherein, on condition that multiple objects are within range of the shared display, the host computer is configured to provide distinct regions corresponding to each object on the shared display.

3. The system according to claim 2, wherein the distinct regions are predetermined.

4. The system according to claim 2, wherein the distinct regions are use-defined.

5. The system according to claim 2, wherein the host computer is further configured to display an interaction region adjacent to each distinct region on the shared display, the interaction region facilitating interaction of the object corresponding to that distinct region and the shared display.

6. The system according to claim 5, wherein the interaction region includes options displayed on a display on the object with additional information.

7. The system according to claim 5, wherein the interaction region includes instructions on how to interact with a display on the object.

8. The system according to claim 5, wherein the interaction region includes options on the shared display to be selected on the shared display to control the object.

9. The system according to claim 5, wherein the interaction region includes instructions on how to interact with the interaction region from the object.

10. The system according to claim 9, wherein the instructions include dragging an item on a display of the object to the interaction region or dragging an item from the shared display onto the object.

11. The system according to claim 1, wherein, on condition that the host computer and the object are connected, the host computer requires a login, interactive application is configured to login to the host computer.

12. The system according to claim 1, wherein, on condition that the host computer and the object are connected and the host computer is a known host computer that requires a login, the interactive application is configured to login to known host computer.

13. The system according to claim 1, wherein, on condition that the host computer and the object are connected and the host computer is a known host computer, the interactive application is configured to provide user preferences to the known host computer.

14. The system according to claim 1, wherein, on condition that the host computer and the object are connected and the host computer is a known host computer, the interactive application is configured to provide payment information to the known host computer.

15. The system according to claim 1, wherein, on condition that the host computer and the object are connected and the host computer is a known host computer, the interactive application is configured to provide saved sessions to the known host computer.

16. The system according to claim 1, wherein, on condition that the host computer and the object are connected and the host computer is a known host computer, the interactive application is configured to provide user history to the known host computer.

17. The system according to claim 1, wherein the connection request message includes an activation code that correspond to a particular time for the object to be connected to the shared display.

18. The system according to claim 1, wherein, on condition that multiple objects are within range of the shared display, the host computer is configured to send the connection request message to all objects detected.

* * * * *